United States Patent Office 3,674,641
Patented July 4, 1972

3,674,641
PROCESS FOR PRODUCING 5′-PURINE NUCLEOTIDES
Katsunobu Tanaka, Machida-shi, Takashi Nara, Tokyo, Masanaru Misawa, Kawasaki-shi, and Toshio Komuro, Tokyo, Japan, assignors to Kyowa Hakko Kogyo Co., Ltd., Tokyo, Japan
No Drawing. Continuation of application Ser. No. 536,317, Mar. 22, 1966. This application July 15, 1968, Ser. No. 744,641
Claims priority, application Japan, Mar. 31, 1965, 40/18,243
Int. Cl. C12d 13/06
U.S. Cl. 195—28 N  12 Claims

ABSTRACT OF THE DISCLOSURE

A process of producing 5′-purine nucleotides, such as 5′-inosinic acid, 5′-guanylic acid, 5′-adenylic acid and 5′-xanthylic acid, by fermentation. A microorganism, e.g., *Arthrobacter simplex* ATCC 15799, is cultured in an aqueous medium containing, as a carbon source, at least one hydrocarbon. The hydrocarbon is, for example, kerosene, paraffin, cycloparaffin, olefin, cycloolefin, benzene, a lower alkyl-substituted benzene, light oil or heavy oil.

CROSS-REFERENCE TO RELATED APPLICATION

This application is a continuation of copendng application Ser. No. 536,317, filed on Mar. 22, 1966, which is now abandoned.

This invention relates to a process for producing 5′-purine nucleotides. More particularly, it relates to a process for the production of 5′-purine nucleotides by fermentation. Even more particularly, the invention relates to a process for the production of 5′-purine nucleotides such as 5′-inosinic acid, 5′-guanylic acid, 5′-adenylic acid, 5′-xanthylic acid and the like by fermentation in the presence of hydrocarbons.

5′-purine nucleotides such as 5′-adenylic acid and 5′-guanylic acid are well known and have wide utility in the art. For example, such compounds are used to a great extent in biochemical research.

Recently, various studies concerning hydrocarbon fermentation have been carried out and, particularly, much work has been done on the production of various kinds of amino acids such as glutamic acid, etc., organic acids, vitamins and the like from hydrocarbons. Moreover, processes for making nucleic acid-related compounds such as 5′-inosinic acid, 5′-guanylic acid, and the like by direct accumulation in a culture medium according to conventional culturing methods with the use of hydrocarbons as the main carbon source have been studied. However, a process for directly producing 5′-purine nucleotides by fermentation with the use of hydrocarbons as the main carbon source has not been accomplished in the prior art heretofore.

One of the objects of the present invention is to provide an improved process for the preparation of 5′-purine nucleotides which overcomes the disadvantages and deficiencies of the prior art methods.

Another object of the present invention is to provide a process for producing 5′-purine nucleotides by fermentation which may be carried out in an efficacious and simple manner.

A further object of the invention is to provide a process for preparing 5′-purine nucleotides such as 5′-adenylic acid, 5′-guanylic acid and the like which gives the product in high purity and good yield.

A still further object of the invention is to provide a process for producing 5′-purine nucleotides by fermentation which may be carried out advantageously on an industrial scale to give a high yield of product.

These and other objects and advantages of the present invention will become apparent to those skilled in the art from a consideration of the following specification and claims.

In accordance with the present invention, it has been found that an efficacious process for the direct production of 5′-purine nucleotides such as 5′-inosinic acid, 5′-guanylic acid, 5′-adenylic acid, 5′-xanthylic acid and the like is effected by culturing microorganisms capable of producing 5′-purine nucleotides in a culture medium which contains hydrocarbons as the main carbon source.

Microorganisms which have an ability to produce 5′-purine nucleotides include bacteria such as Pseudomonas, Arthrobacter, Corynebacterium, Micrococcus, Brevibacterium, Achromobacter, etc., yeasts such as Candida, Torula, etc., molds such as Aspergillus, Penicillium, etc. and strains of actinomycetes having an ability to produce 5′-purine nucleotides. The latter are chiefly strains derived from light oils, kerosene, heavy oils and the like. Of course, mutant stains of any of these microorganisms which are induced by hereditary mutation may be employed in the present invention.

When wild strains are employed, the corresponding 5′-purine nucleotides are accumulated by the addition of purine bases such as hypoxanthine, guanine, adenine, etc. to the fermentation medium. Some strains produce 5′-inosinic acid upon the addition of adenine to the fermentation medium. The mutant strains to be employed are chiefly those requiring adenine or guanine for their growth. The adenine-requiring mutant strains accumulate 5′ - inosinic acid and, sometimes, small amounts of 5′-guanylic acid. Guanine-requiring mutant strains accumulate 5′-xanthylic acid.

Either a synthetic culture medium or a natural medium is suitable in the present invention as long as it contains the essential nutrients for the grows of the particular strain employed and, in accordance with the present invention, contains a hydrocarbon as the main carbon source therein. Such nutrients are well known in the art and include substances such as a nitrogen source, inorganic compounds and the like which are utilized by the microorganism employed in appropriate amounts. As a nitrogen source, various kinds of inorganic or organic salts or compounds, such as urea or ammonia or ammonium salts such as ammonium sulfate, ammonium chloride, ammonium nitrate, etc., or natural substances containing nitrogen such as cornsteep liquor, peptone, meat extract, yeast extract, casein hydrolysates, fish meal, etc. may be employed. Mixtures of two or more of these substances may be used. Inorganic compounds which may be added to the culture medium include magnesium sulfate, potassium dihydrogen phosphate, potassium monohydrogen phosphate, sodium chloride, iron sulfate, as well as other conventionally used salts of magnesium, iron, manganese, zinc, calcium and the like. Mixtures of such inorganic compounds may be employed. Also, nutrients essential for the growth of the particular strain employed are added to the medium, for example, vitamins such as biotin, thiamine, pantothenic acid, p-aminobenzoic acid, nicotinic acid, etc. and various kinds of amino acids such as glutamic acid, etc.

When the fermentation is carried out with the use of wild strains, purine bases such as hypoxanthine, adenine, guanine and the like are added to the culture medium. When mutant strains are used, adenine, guanine and the like that are required should be added to the culture medium.

The fermentation is conducted under aerobic conditions conventional in the art, such as aerobic shaking of the culture or with stirring of a submerged culture with the introduction of sterilized air thereinto, at a temperature of about 20° to 40° C. and pH of about 5 to 9. It is advantageous in the fermentation of the present invention, however, to increase the aeration to an extent greater than that usually employed.

After the completion of fermentation, the 5'-purine nucleotide obtained may be separated from the fermentation liquor by conventional means, such as ion exchange resin treatment, extraction with solvents, chromatography and the like.

Kerosene is a particularly advantageous carbon source to be employed in the process of the present invention. When this substance is used, phosphoric acid salts are generally employed in the culture medium in comparatively high concentrations.

It is to be understood that a mixture of two or more hydrocarbons may be employed in the culture medium within the context of the present invention.

The following examples are given merely as illustrative of the present invention and are not to be considered as limiting. Unless otherwise noted, the percentages therein are by weight per liter of water. The yield of the accumulated products is expressed in mg./ml. of 2-sodium-5'-inosinate, 5'-guanylic acid, 5'-adenylic acid and 5'-xanthylic acid, respectively.

EXAMPLE 1

*Arthrobacter simplex* ATCC 15799 is used as the seed bacterium. It is cultivated for 24 hours in a glucose-bouillon seed medium. The seed culture is then inoculated into 30 ml. of fermentation medium contained in 250 ml. Erlenmeyer flasks. The fermentation medium employed has the following composition:

5% kerosene
0.5% $K_2HPO_4$
0.6% $KH_2PO_4$
0.6% $MgSO_4 \cdot 7H_2O$
10 μg./l. $MnSO_4 \cdot 4H_2O$
5 mg./l. $FeSO_4 \cdot 7H_2O$
100 μg./l. $ZnSO_4 \cdot 7H_2O$
0.1% $CaCl_2 \cdot 2H_2O$
30 μg./l. biotin
2 μg./ml. thiamine hydrochloride
10 μg./ml. calcium pantothenate
0.5% N-Z-Amine (trademark for a series of casein hydrolysates)

The pH of the fermentation medium is adjusted to 7.4 before sterilization thereof. After sterilization, urea, which is sterilized separately, is added to the fermentation medium in an amount of 0.5%.

After 24 hours of culturing with aerobic shaking, hypoxanthine, guanine and adenine, respectively, are each added in an amount of 500 μg./ml. to the various flasks. The amounts of 5'-purine nucleotides accumulated after 96 hours of culturing as a result thereof are shown in Table 1.

TABLE 1

Purine base added—Amount of 5'-purine nucleotide accumulated
Hypoxanthine—5'-inosinic acid 1.9 mg./ml. (as the 2-sodium salt)
Guanine—5'-guanylic acid 0.9 mg./ml.
Adenine—5'-adenylic acid 1.3 mg./ml.

EXAMPLE 2

*Corynebacterium hydrocarboclastus* ATCC 15592, *Candida utilis* ATCC 16321 and *Aspergillus oryzae* KY89 ATCC 16450 (a histidine and methionine-requiring strain) are used as the seed microorganisms. The same fermentation medium as that described in Example 1 is used except that yeast extract is also added to the fermentation conducted with *Corynebacterium hydrocarboclastus* and *Candida utilis* in the amounts shown in Table 2. The conditions of culturing are identical to those described in Example 1.

The amounts of 5'-purine nucleotides accumulated in the culture liquor after 96 hours of culturing are shown in Table 2.

TABLE 2

| Strain employed | Addition to the fermentation medium of Example 1 | Purine base added | Amount of 5'-purine nucleotide accumulated (mg./ml.) |
|---|---|---|---|
| *Corynebacterium hydrocarboclastus* ATCC 15592. | Yeast extract, 0.2%. | Guanine | 5'-guanylic acid, 0.35. |
| *Candida utilis* ATCC 16321. | Yeast extract, 0.5%. | Adenine | 5'-adenylic acid, 1.2. |
| *Aspergillus oryzae* KY89 ATCC 16450. | None | do | 5'-inosinic acid, [1] 0.25. |

[1] (2-sodium salt).

The strains of microorganisms set forth in the above examples are on deposit at the American Type Culture Collection, Rockville, Maryland, U.S.A.

Although kerosene has been specifically shown as the hydrocarbon in the examples herein, it is to be understood that other appropriate hydrocarbons may be employed within the context of the present invention. Such hydrocarbons include straight- and branched-chained paraffins (alkanes) such as n-pentane, n-octane, n-decane, n-dodecane, n-hexadecane, isopentane, isooctane, etc., cycloparaffins such as cyclohexane and cyclooctane, straight- and branched-chained olefins such as pentene-2, hexene-1, octene-1, octene-2, etc., cycloolefins such as cyclohexene, aromatic hydrocarbons such as benzene, o-xylene, etc., and mixtures thereof and mixed hydrocarbons such as kerosene, light oils, heavy oils, paraffin oils, etc.

Small amounts of other carbon sources such as glucose, fructose, mannose, galactose, sucrose, starch hydrolysate, waste molasses, etc., may be used in the fermentation medium along with the hydrocarbon.

The invention being thus described, it will be obvious that the same may be varied in many ways. Such variations are not to be regarded as a departure from the spirit and scope of the invention, and all such modifications as would be obvious to one skilled in the art are intended to be included herein:

What we claim is:

1. A process for producing a 5'-purine nucleotide mixture of 5'-inosinic acid, 5'-guanylic acid and 5'-adenylic acid which comprises culturing *Arthrobacter simplex* ATCC 15799 in an aqueous nutrient medium under aerobic conditions in the presence of at least one hydrocarbon as the main carbon source, accumulating said mixture in the resultant culture liquor, and recovering said mixture therefrom.

2. The process of claim 1, wherein said hydrocarbon is kerosene.

3. The process of claim 1, wherein said hydrocarbon is a paraffin.

4. The process of claim 1, wherein said hydrocarbon is a cycloparaffin.

5. The process of claim 1, wherein said hydrocarbon is an olefin.

6. The process of claim 1, wherein said hydrocarbon is a cycloolefin.

7. The process of claim 1, wherein said hydrocarbon is benzene.

8. The process of claim 1, wherein said hydrocarbon is a lower alkyl-substituted benzene.

9. The process of claim 1, wherein said hydrocarbon is a light or heavy oil.

10. The process of claim 1, wherein 5'-inosinic acid, 5'-guanylic acid or 5'-adenylic acid is isolated from the recovered mixture.

11. The process of claim 1, wherein culturing is carried out at a temperature of about 20° to 40° C. and a pH of about 5 to 9.

12. The process of claim 2, wherein said nutrient medium contains a phosphoric acid salt.

References Cited

UNITED STATES PATENTS

| | | | |
|---|---|---|---|
| 3,057,784 | 10/1962 | Davis et al. | 195—28 |
| 3,135,666 | 6/1964 | Hara et al. | 195—28 N |
| 3,152,966 | 10/1964 | Kinoshita et al. | 195—28 N |
| 3,201,327 | 8/1965 | Beck | 195—28 |
| 3,224,946 | 12/1965 | Raymond | 195—3 |
| 3,298,923 | 1/1967 | Banno et al. | 195—28 N |
| 3,355,296 | 11/1967 | Perkins et al. | 195—28 |

FOREIGN PATENTS

| | | | |
|---|---|---|---|
| 983,213 | 2/1965 | Great Britain | 195—28 N |

ALVIN E. TANENHOLTZ, Primary Examiner